United States Patent
Lin et al.

(10) Patent No.: US 8,825,323 B2
(45) Date of Patent: Sep. 2, 2014

(54) MACHINE CONTROL SYSTEM IMPLEMENTING SPEED-BASED CLUTCH MODULATION

(75) Inventors: Hong-Chin Lin, Glenview, IL (US); Michael A. Spielman, Jr., Brookfield, IL (US); Paul Douglas Hagen, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 1363 days.

(21) Appl. No.: 12/010,260

(22) Filed: Jan. 23, 2008

(65) Prior Publication Data
US 2009/0187318 A1 Jul. 23, 2009

(51) Int. Cl.
*G06F 19/00* (2011.01)
*B60W 10/18* (2012.01)
*B60W 10/02* (2006.01)
*B60W 30/18* (2012.01)

(52) U.S. Cl.
CPC .............. *B60W 10/02* (2013.01); *B60W 10/18* (2013.01); *B60W 30/18054* (2013.01); *B60W 2510/0638* (2013.01); *B60W 2540/14* (2013.01); *B60Y 2200/415* (2013.01)
USPC ................................. 701/67; 701/50; 701/68

(58) Field of Classification Search
CPC . B60W 10/02; B60W 10/023; B60W 10/026; B60W 10/18; B60W 10/182; B60W 10/184; B60W 10/188; B60W 2510/0225; B60W 2510/0638; B60W 2540/14; B60W 2710/023; B60W 2710/024; B60W 2710/025; B60W 2710/026; B60Y 2200/40; B60Y 2200/41; B60Y 2200/411; B60Y 2200/412; B60Y 2200/413; B60Y 2200/414; B60Y 2200/415; B60Y 2200/416; B60Y 2300/42; B60Y 2300/421; B60Y 2400/426; E02F 9/2253; F16D 2500/50669; F16H 2061/14; F16H 2061/143; F16H 2061/1459
USPC ............. 701/50, 67, 68; 123/197.5; 180/53.1, 180/315, 336, 338; 192/48.7, 52.1, 109 D, 192/109 F; 416/32, 43, 60, 169 R
See application file for complete search history.

(56) References Cited

U.S. PATENT DOCUMENTS

| | | | |
|---|---|---|---|
| 5,380,257 A * | 1/1995 | Coffman et al. | 477/175 |
| 5,456,333 A * | 10/1995 | Brandt et al. | 180/336 |
| 5,613,581 A | 3/1997 | Fonkalsrud et al. | |
| 5,699,248 A | 12/1997 | Nakagami et al. | |
| 5,718,316 A * | 2/1998 | Gee | 192/109 F |
| 5,720,358 A | 2/1998 | Christensen et al. | |
| 5,802,490 A | 9/1998 | Droste | |
| 5,968,103 A | 10/1999 | Rocke | |
| 6,085,136 A | 7/2000 | Katakura et al. | |
| 6,234,254 B1 | 5/2001 | Dietz et al. | |
| 6,253,140 B1 | 6/2001 | Jain et al. | |
| 6,560,549 B2 | 5/2003 | Fonkalsrud et al. | |
| 2005/0090962 A1 | 4/2005 | Ota et al. | |
| 2007/0083315 A1 | 4/2007 | Takamatsu et al. | |

* cited by examiner

*Primary Examiner* — Jerrah Edwards
(74) *Attorney, Agent, or Firm* — Finnegan, Henderson, Farabow, Garrett & Dunner LLP

(57) ABSTRACT

A machine control system for use with a machine having a power source and a transmission is disclosed. The machine control system may have a clutch configured to connect an output of the power source with an input of the transmission. The machine control system may also have a sensor configured to generate a signal indicative of a speed of the power source, and a controller in communication with the clutch and the sensor. The controller may be configured to vary an actuating force of the clutch based on the signal.

18 Claims, 3 Drawing Sheets

MACHINE CONTROL SYSTEM IMPLEMENTING SPEED-BASED CLUTCH MODULATION

TECHNICAL FIELD

The present disclosure relates generally to a machine control system and, more particularly, to a machine control system that implements engine speed-based clutch modulation.

BACKGROUND

Machines, including on- and off-highway haul and vocational trucks, wheel loaders, motor graders, and other types of heavy machinery generally include a multi-speed, bidirectional, mechanical transmission drivingly coupled to an engine by way of a torque converter assembly. The torque converter is a fluid coupling that multiplies and/or absorbs torque fluctuations transmitted between the engine and the traction devices of the machine by allowing slippage between an output shaft of the engine and an input shaft of the transmission. The torque converter assembly includes an impeller clutch to allow the operator a degree of freedom in determining the slippage between the output shaft of the engine and the input shaft of the torque converter (i.e., the impeller). The impeller clutch allows for high engine speeds while limiting the amount of torque that is transmitted into the torque converter, thus allowing some of the torque to be directed for other purposes.

As an operator depresses an impeller clutch pedal, the force keeping the impeller clutch engaged is proportionally reduced. As the force decreases, the clutch may begin to slip and less torque is transmitted from the engine to the torque converter. The amount of force applied to the clutch is selected such that, at high idle speed when the clutch pedal is not depressed, the clutch does not slip and substantially all of the torque generated by the engine is passed to the torque converter.

Although efficient at high idle speed, the magnitude of the force applied to the clutch when the pedal is not depressed may be sub-optimal at lower engine speeds. That is, the amount of torque generated by the engine may be somewhat proportional to the speed of the engine. As such, when the engine speed decreases, the torque produced by the engine likewise decreases. Thus, at a lower engine speed, less force is required to prevent the clutch from slipping because less torque is being produced by the engine and transmitted through the clutch. However, because the force applied to the clutch to maintain engagement corresponds with engine torque at high-idle speed, the force must be greatly reduced before any clutch slippage occurs. For this reason, modulation of the transmitted torque may be sluggish when the pedal is depressed at low engine speeds.

One system focused on improved impeller clutch control is disclosed in U.S. Pat. No. 5,613,581 (the '581 patent) issued to Fonkalsrud et al. on Mar. 25, 1997. The '581 patent discloses an electro-hydraulic control device for a drive train of a machine including an engine, a transmission, a torque converter, and an impeller clutch. A manually operated impeller clutch pedal produces an impeller clutch pedal signal in response to the position of the impeller clutch pedal. An impeller clutch electro-hydraulic valve produces fluid flow to the impeller clutch to controllable engage and disengage the impeller clutch. An impeller clutch pressure curve that is responsive to the impeller clutch pedal position is stored in memory. A rotary position switch selects a desired rimpull setting indicative of a desired reduction in rimpull and produces a desired rimpull signal. An electronic controller receives the desired rimpull signal and reconfigures the impeller clutch pressure curve. Thereafter, the electronic controller receives the impeller clutch pedal signal and controllably actuates the electro-hydraulic valve to produce a desired impeller clutch pressure defined by the impeller clutch pressure curve. This allows the operator to customize the reduced rimpull settings depending upon the machine operating conditions by way of improved pedal modulation.

Although the device of the '581 patent may improve control over the impeller clutch, it may still be sub-optimal. That is, having multiple impeller clutch pressure curves stored in memory may increase the cost and complexity of the system. And, because the system is manually activated, it may become burdensome on the operator. Further, the system still has some delays associated with operation of the machine at an engine speed less than high-idle, and the operational consistency experienced by an operator under varying engine speeds may be less than desired.

The disclosed control system is directed to overcoming one or more of the problems set forth above.

SUMMARY

In one aspect, the present disclosure is directed to a machine control system for use with a machine having a power source and a transmission. The machine control system may include a clutch configured to connect an output of the power source with an input of the transmission. The machine control system may also include a sensor configured to generate a signal indicative of a speed of the power source, and a controller in communication with the clutch and the sensor. The controller may be configured to vary an actuation force of the clutch based on the signal.

In another aspect, the present disclosure is directed to a method of operating a machine. The method may include generating power having a speed component, and engaging a coupling to transmit the power to propel the machine. The method may also include varying the engagement of the coupling based on the speed component.

DETAILED DESCRIPTION

Figure 1:
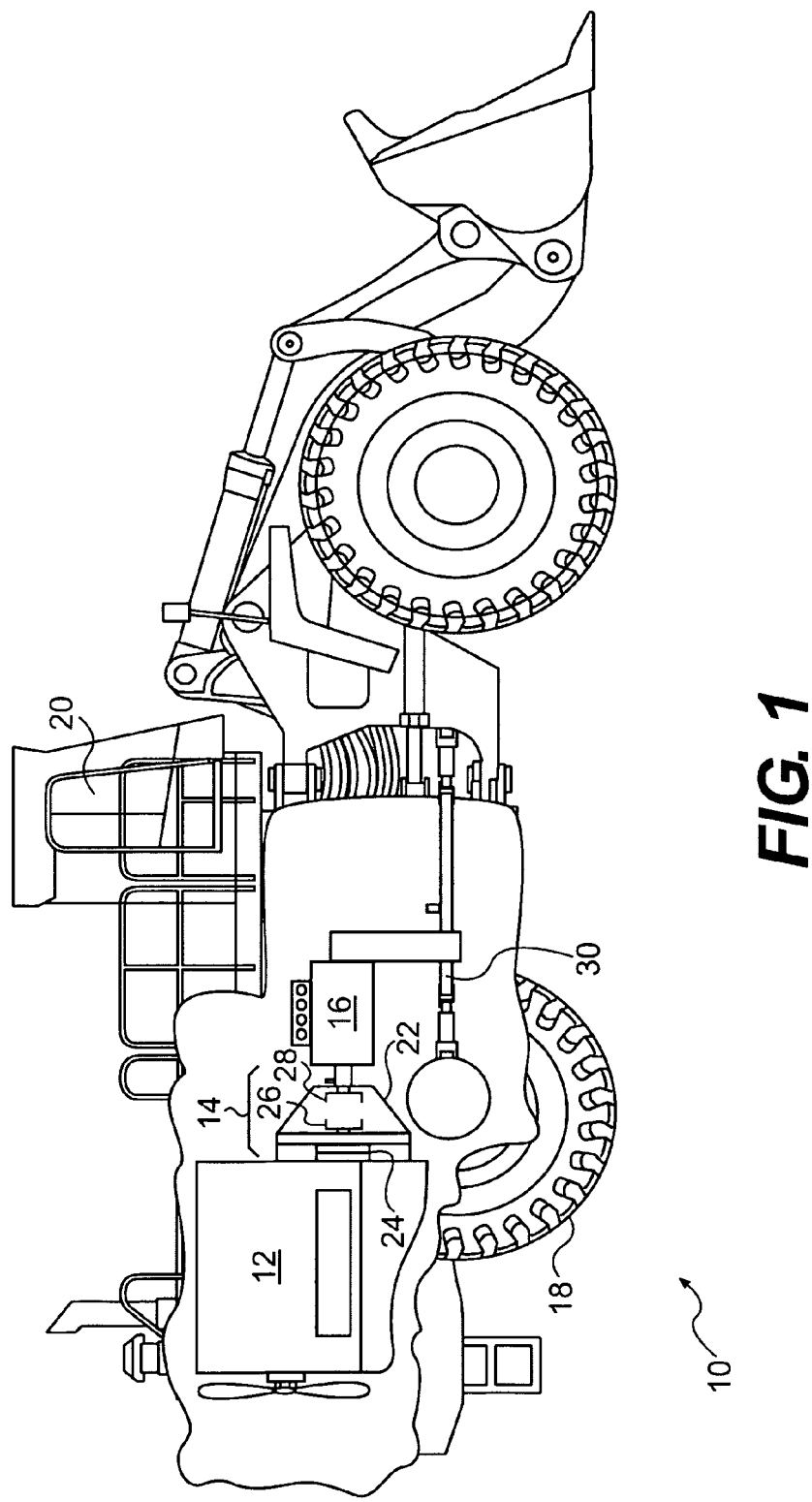
FIG. 1 is a diagrammatic illustration of an exemplary disclosed machine.

FIG. 1 illustrates an exemplary machine 10. Machine 10 may embody a mobile machine that performs some type of operation associated with an industry such as mining, construction, farming, transportation, or any other industry known in the art. For example, machine 10 may be an earth-moving or material-handling machine such as a wheel loader, an off-highway haul truck, a motor grader, or any other suitable earth moving machine. Machine 10 may alternatively embody an on-highway vocational truck, a passenger vehicle, or any other operation-performing machine. Machine 10 may include, among other things, a power source 12, a torque converter assembly 14, a transmission 16 operatively connected between the torque converter assembly 14 and a traction device 18, and an operator station 20.

Power source 12 may produce a power output having both torque and rotational speed components (i.e., Power=Torque×Speed, wherein Speed may be a rotational speed, for example, of a shaft), and may embody an internal combustion engine. For example, power source 12 may embody a diesel engine, a gasoline engine, a gaseous fuel-powered engine, or any other engine apparent to one skilled in the art. Power source 12 may contain an engine block having a plurality of cylinders (not shown), reciprocating pistons disposed within the cylinders (not shown), and a crankshaft operatively connected to the pistons (not shown). The internal combustion engine may use a combustion cycle to convert potential energy (usually in chemical form) to a rotational output of the crankshaft, which may in turn rotate an input of torque converter assembly 14.

Torque converter assembly 14 may be used to transmit torque from power source 12 to transmission 16. Torque converter assembly 14 may include a torque converter 22 and an impeller clutch 24. Torque converter 22 may be a hydromechanical device configured to transmit torque from power source 12 to transmission 16. Torque converter 22 may allow power source 12 to rotate somewhat independently of transmission 16. For example, torque converter 22 may contain an impeller 26 and a turbine 28. Impeller 26 may be connected to an output of impeller clutch 24. It is also contemplated that impeller 26 may alternatively be directly connected to power source 12 (i.e., directly connected to the crankshaft of power source 12), and another clutch may be located on an output side of torque converter 22, if desired. For example, a first clutch of transmission 16 (not shown) may perform a function similar to that performed by impeller clutch 24.

Impeller 26 may rotate as a result of power source operation (dependent on the degree of impeller clutch engagement). This rotation of impeller 26 may thus impart momentum to fluid within torque converter 22. Turbine 28, connected to transmission 16, may receive this momentum, thus causing turbine 28 and connected transmission 16 to rotate. At low fluid flow rates and pressures, impeller 26 may rotate at a higher speed relative to turbine 28. However, as the pressure and the flow rate of the fluid conducted between impeller 26 and turbine 28 increase, the rotational speed of turbine 28 may approach the rotational speed of impeller 26.

Impeller clutch 24 may allow variable engagement between power source 12 and transmission 16. Specifically, impeller clutch 24 may allow power source 12 to rotate at a relatively high speed and high torque, while allowing transmission 16 to rotate at a lower speed and/or with reduced torque. Impeller clutch 24 may embody a disc-type clutch located between the output of power source 12 and the input of torque converter 22. Impeller clutch 24 may contain an input disk and an output disk. The input disk may be connected to power source 12 and may rotate as a result of power source operation. The output disk may be oriented substantially coaxially relative to the input disk and may be connected to the input of torque converter 22. The input disk and the output disk of impeller clutch 24 may be selectively engaged by a hydraulic and/or mechanical actuator that axially presses the disks together, thus allowing frictional forces to couple the rotation of the input disk to the rotation of the output disk or vice versa. The magnitude of the pressure applied to the impeller clutch disks may be related to the magnitude of the frictional forces and, subsequently, to the magnitude of the torque transmitted between power source 12 and transmission 16. Impeller clutch 24 may reduce the coupling of power source 12 to transmission 16 by decreasing the degree of frictional engagement between the input disk and the output disk, thus allowing the disks to rotate more freely relative to each other. Similarly, impeller clutch 24 may increase the coupling of power source 12 to transmission 16 by increasing the degree of frictional engagement between the input disk and the output disk (i.e., by increasing the pressure forcing the disks together). It is contemplated that impeller clutch 24 may be activated manually, as will be described below, or automatically via a controller (not shown). Impeller clutch 24 may generate a signal indicative of its degree of engagement.

Transmission 16 may include numerous components that interact to transmit power from power source 12 to traction device 18. In particular, transmission 16 may embody a multi-speed, bidirectional, mechanical transmission having a neutral position, a plurality of forward gear ratios, one or more reverse gear ratios, and one or more clutches (not shown) for selectively engaging predetermined combinations of gears (not shown) that produce a desired output gear ratio. Transmission 16 may be an automatic-type transmission, wherein shifting is based on a power source speed, a maximum operator selected gear ratio, and a shift map stored within a transmission controller. Alternatively, transmission 16 may be a manual transmission, wherein the operator manually engages the actual gear combinations. The output of transmission 16 may be connected to rotatably drive traction device 18 via a shaft 30, thereby propelling machine 10. It is contemplated that transmission 16 may alternatively include only a single gear combination or no gear combinations at all, if desired, such as in a continuously variable or parallel path type of transmission.

Traction device 18 may include wheels located on each side of machine 10 (only one side shown). Alternately, traction device 18 may include tracks, belts, or other driven traction devices. Traction device 18 may be driven by transmission 16 to rotate in accordance with an output rotation of transmission 16.

Figure 2:
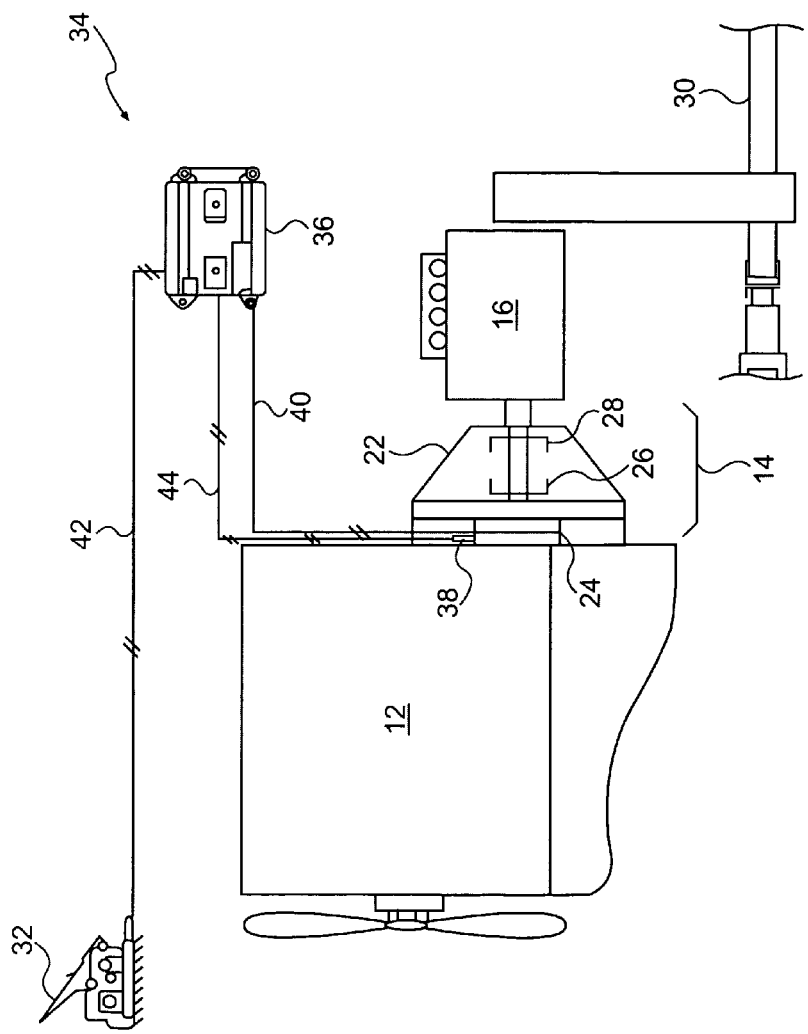
FIG. 2 is a diagrammatic illustration of an exemplary disclosed control system that may be used with the machine of FIG. 1.

Operator station 20 may include one or more operator interface devices. The operator interface devices may be located proximal an operator seat and embody, for example, a pedal, a single or multi-axis joysticks, wheels, knobs, push-pull devices, switches, and other operator interface devices known in the art. As shown in FIG. 2, one such interface device may include an impeller clutch pedal 32.

Impeller clutch pedal 32 may be manually actuated to allow variable control of impeller clutch 24 and of a friction type brake mechanism (not shown). The degree of impeller clutch pedal actuation may be related to a degree coupling engagement between power source 12 and transmission 16 affected by impeller clutch 24, as will be described in more detail below. Impeller clutch pedal 32 may be movable through a range of motion from a neutral position to a maximum displaced position. As impeller clutch pedal 32 is displaced away from the neutral position, a signal indicative of the displaced position may be generated. In some embodiments, the displaced position may be related to an operator desired reduction in the amount of torque transmitted from power source 12 to transmission 16.

The impeller clutch pedal range of motion may be divided into different portions. For example, some portion of the impeller clutch pedal range of motion (i.e., about the first 6%) may be considered a deadband portion. When displaced to a position within the deadband, movement of impeller clutch pedal 32 may have little effect on impeller clutch operation. That is, when in the neutral position or displaced within the first 6% of its range of motion, impeller clutch pedal 32 may signal for impeller clutch 24 to remain fully engaged. Similarly, some portion of the impeller clutch pedal range of motion (e.g., about the last 50%) may be used to actuate the brake mechanism. As the operator depresses impeller clutch pedal 32, impeller clutch 24 may disengage until it is almost fully disengaged at around 50% of the travel of impeller clutch pedal 32. And, if the operator continues to depress impeller clutch pedal 32 through the remaining 50% of the range of motion, the brake mechanism may become engaged and engage to an increasing degree as the impeller clutch pedal is depressed further. In some embodiments, the brake mechanism may engage as soon as at about 40% of the impeller clutch pedal travel. It is contemplated that impeller clutch pedal 32 may embody a mechanical device, an electrical device, a hydraulic device, or any other type of device known in the art.

As illustrated in FIG. 2, machine 10 may also include a control system 34 having components that cooperate to regulate operation of torque converter assembly 14. In particular, control system 34 may include a controller 36 in communication with impeller clutch 24, with impeller clutch pedal 32, and with an engine speed sensor 38. Controller 36 may communicate with impeller clutch 24 via a communication line 40, with impeller clutch pedal 32 via a communication line 42, and with engine speed sensor 38 via a communication line 44. In response to input received from impeller clutch pedal 32 and from engine speed sensor 38, controller 36 may engage, disengage, and vary the degree of engagement of impeller clutch 24.

Controller 36 may embody a single microprocessor or multiple microprocessors that include a means for receiving input from and providing output to control system 34. Numerous commercially available microprocessors may be configured to perform the functions of controller 36. It should be appreciated that controller 36 may readily embody a general machine microprocessor capable of controlling numerous machine functions. Various other circuits may be associated with controller 36, such as power supply circuitry, signal conditioning circuitry, data acquisition circuitry, signal output circuitry, signal amplification circuitry, and other types of circuitry known in the art.

It is also considered that controller 36 may include one or more maps stored within an internal memory of controller 36 and that controller 36 may reference these maps during the regulation of impeller clutch 24. Each of these maps may include a collection of data in the form of tables, graphs, and/or equations. For example, one map may relate an engine speed, as measured by sensor 38, and a displacement position of impeller clutch pedal 32 to an activation pressure or force of impeller clutch 24 that results in an operator desired amount of torque being transferred from power source 12 to transmission 16. Alternatively, a first map may relate the engine speed to a Roll-off pressure, while a second map may relate the Roll-off pressure and the displacement position of impeller clutch pedal 32 to the activation pressure or force of impeller clutch 24. For the purposes of this disclosure, the Roll-off pressure is to be considered the pressure at which any further reduction may result in some slippage of impeller clutch 24 at the current torque levels (i.e., at the torque absorption levels of torque converter 14 corresponding to the current engine speed). The Roll-off pressure may be achieved when impeller clutch pedal 32 is depressed to a displaced boundary of the deadband (i.e., when impeller clutch pedal 32 is displaced to about 6% of its range of motion). The change in actuating pressure or force from a Full-on pressure (the pressure applied to impeller clutch 24 when impeller clutch 24 is not depressed) and the Roll-off pressure may be a step wise change. It is contemplated, however, that this change in pressure may be more gradual, if desired.

Controller 36 may use any control method known in the art to regulate operation of impeller clutch 24 such as, for example, bang-bang control, proportional control, proportional integral derivative control, adaptive control, model-based control, or logic-based control. Controller 36 may use either feedforward or feedback control.

Figure 3:
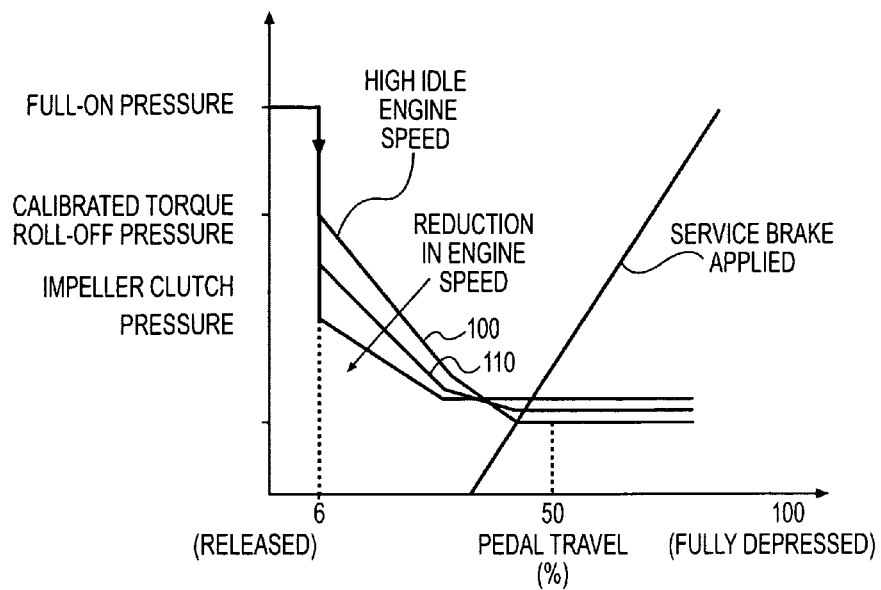
FIG. 3 is an exemplary performance curve associated with the machine of FIG. 1.
Figure 4:
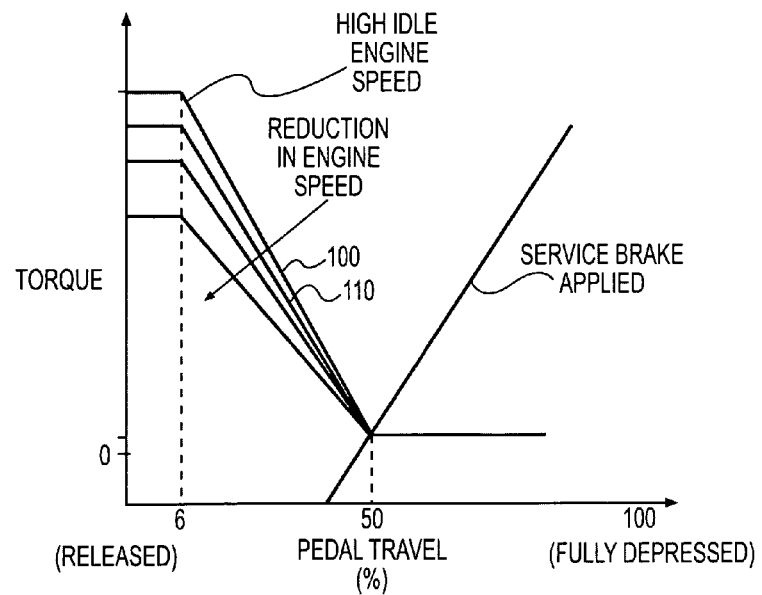
FIG. 4 is another exemplary performance curve associated with the machine of FIG. 1.

FIGS. 3 and 4 outline exemplary operations of control system 34. These figures will be discussed in detail below.

INDUSTRIAL APPLICABILITY

The presently disclosed control system may be applicable to any machine having an impeller clutch where responsiveness thereof affects performance of the machine. The disclosed system may improve responsiveness of the impeller clutch by reducing a Roll-off pressure based on a speed of the engine prior to active modulation. By reducing the Roll-off pressure, the deadband from depression of an impeller clutch pedal to a reduction in rimpull torque may be decreased. The operation of machine 10 will be described below.

During operation of machine 10, an operator may set the speed of power source 12 to high idle and engage a desired combination of gears within transmission 16 to initiate travel. As machine 10 is propelled, torque may be transferred from power source 12 through engaged impeller clutch 24, from impeller 26 to turbine 28, and through the gearing of transmission 16 to traction devices 18 (referring to FIG. 1). In some situations, the operator may desire less torque to be transferred from power source 12 to traction devices 18. For example, when digging into a pile of earthen material, traction devices 18 may begin to spin under a high torque output. To minimize wheel slippage or spin, the operator may depress impeller clutch pedal 32 to reduce the rimpull torque of machine 10 (i.e., to reduce the amount of torque at the wheels). Also, once into the pile of earthen material, the operator may desire to lift a tool of machine 10 that is loaded with the material. To increase the lift capacity or lift speed, the operator may desire to transfer torque from traction devices 18 to a hydraulic circuit associated with the tool. Again, to accomplish this transfer of torque, the operator may depress impeller clutch pedal 32.

With reference to FIGS. 3 and 4, an uppermost curve 100 may represent the situation described above, where machine 10 is operating at high idle and impeller clutch pedal 32 is being depressed. As can be seen from this curve, before impeller clutch pedal 32 is depressed, the actuating pressure of impeller clutch 24 may be at a maximum value (referring to FIG. 3), the Full-on pressure. In this state, slip of impeller clutch 24 may be minimized and substantially all of the torque produced by power source 12 and transmitted to impeller clutch 24 may be transferred on to traction devices 18 (referring to FIG. 4). As impeller clutch pedal 32 is depressed through the deadband (i.e. through the first 6% of its range of motion), little change in the actuating pressure can be observed (FIG. 3). However, as the position of impeller clutch pedal 32 reaches the displaced boundary of the deadband, the actuating pressure of impeller clutch 24 may quickly drop from the Full-on pressure to a Roll-off pressure specific to the current speed of power source 12. At the Roll-off pressure, slippage of impeller clutch 24 should still be substantially inhibited and the torque transferred to traction devices 18 substantially unchanged (FIG. 4).

As impeller clutch pedal 32 is depressed past the displaced boundary of the deadband, a reduction in the torque transmitted through to traction devices 18 may be experienced. That is, as impeller clutch pedal 32 is depressed further from about the 6% displaced position to the maximum displaced position, the actuating pressure of impeller clutch 24 may be reduced between the Roll-off pressure and a Dump pressure at a rate corresponding to the current displacement position of impeller clutch pedal 32 (FIG. 3). In one example the relationship between impeller clutch pedal position and the change in actuating pressure may be substantially linear. The maximum torque reduction may be experienced at about 50% travel of impeller clutch pedal 32 (FIG. 4). As impeller clutch pedal 32 is depressed past the 50% displacement position the pressure may be reduced further to the Dump pressure and the brake mechanism may be activated. The Dump pressure may be a minimum allowable pressure that, when combined with brake pressure, may help ensure machine 10 is inhibited from rolling freely (i.e., some positive torque may always be transferred to traction devices 18 when transmission 16 is engaged). The Dump pressure may also keep impeller clutch 24 full of pressurized fluid for quick activation when commanded.

As the engine speed of machine 10 reduces, the Roll-off pressure and the Dump pressure may also change to improve responsiveness of machine 10. That is, as the speed of machine 10 reduces, the torque that can be absorbed and transferred by torque converter 22 to transmission 16 may also reduce. Thus, at a lower engine speed, less torque may be experienced by impeller clutch 24. If the actuating pressure remained at the Roll-off pressure for lower torque levels, a greater reduction in pressure would be required before an affect of depressing impeller clutch pedal 32 could be observed (i.e., before impeller clutch 24 would begin to slip). This greater required reduction in pressure could result in a performance delay and could also require the operator to depress impeller clutch pedal 32 further before any change is affected. To improve responsiveness and provide consistency in impeller clutch pedal operation, the Roll-off pressure may change by an amount related to the change in speed of power source 12. A second curve 110 in FIGS. 3 and 4 may represent this situation.

As can be seen in FIG. 3, when machine 10 is operated at a speed less than high idle and impeller clutch pedal 32 is depressed to the displaced boundary position of the deadband, the actuating pressure may decrease from the Full-on pressure to a reduced Roll-off pressure. The amount of reduction between the high-idle Roll-off pressure and the reduced Roll-off pressure may be related to a speed of power source 12, and the relationship may be stored in the map of controller 36. As impeller clutch pedal 32 is depressed, controller 36 may reference the map and reduce the pressure accordingly. As impeller clutch pedal 32 is depressed past the deadband portion of its range of motion, the actuating pressure may be reduced even more until the 50% displaced position is reached and the Dump pressure is achieved.

As can be seen from curve 110, the Dump pressure may also change as a result of the lowered engine speed. Specifically, for lower engine speeds, the Dump pressure may be higher. That is, because centrifugal forces maintaining impeller clutch 24 engaged may be lower at lower engine speeds, a high actuating pressure may be required to help ensure that impeller clutch 24 does not completely disengage while transmission 16 is engaged (i.e., never allows free rolling movement of machine 10). Thus, the relationship between impeller clutch pedal displacement and actuating pressure reduction (i.e., the rate of reduction) may change with a change in engine speed. This relationship may also be stored within the map of controller 36 and referenced during machine operation. As can be seen from FIG. 4, when impeller clutch pedal 32 is displaced past the 50% displacement position, the torque output may remain substantially the same for all engine speeds.

Several advantages may be realized by the disclosed control system. Specifically, because the actuating pressure inhibiting impeller clutch slippage may be reduced as the amount of torque transmitted through the impeller clutch is reduced, the impeller clutch pedal may maintain consistent and responsive performance for any engine speed. And, because the system may adjust modulation of the impeller clutch automatically, the burden on the operator may remain unchanged or even be reduced. Further, because the system may function with few complex calculations or stored performance curves, it may be simple and inexpensive.

It will be apparent to those skilled in the art that various modifications and variations can be made to the disclosed machine control system. Other embodiments will be apparent to those skilled in the art from consideration of the specification and practice of the disclosed machine control system. It is intended that the specification and examples be considered as exemplary only, with a true scope being indicated by the following claims and their equivalents.

What is claimed is:

1. A machine control system for use with a machine having an engine and a transmission, the machine control system comprising:
   a clutch configured to connect an output of the engine with an input of the transmission;
   a sensor configured to generate an engine speed signal;
   a controller in communication with the clutch and the sensor, the controller being configured to vary an actuating force of the clutch as a function of the engine speed signal;
   an operator input device configured to indicate an operator desired reduction in an amount of torque transferred from the engine to the transmission, wherein the controller is in communication with the operator input device and configured to vary the actuating force of the clutch as a function of the operator desired reduction, the operator input device being movable through a range from a neutral position to a maximum displaced position;
   wherein the controller is configured to vary the actuating force of the clutch such that the actuating force when the operator input device is at a first position within the range is lower for lower engine speeds compared to that for higher engine speeds, and the actuating force when the operator input device is at a second position of greater displacement than the first position is lower for higher engine speeds compared to that for lower engine speeds.

2. The machine control system of claim 1, wherein the range includes a deadband where substantially no change in the actuating force is affected.

3. The machine control system of claim 2, wherein the deadband includes a portion of the range from the neutral position to about 6% of the maximum displaced position.

4. The machine control system of claim 2, wherein when the operator input device is moved to a displaced position at an end of the deadband, the actuating force is changed to a level related to only the engine speed signal.

5. The machine control system of claim 4, wherein the change of the actuating force when the operator input device is moved to the displaced position at the end of the deadband is a step change.

6. The machine control system of claim 4, wherein when the operator input device is moved to a displaced position outside of the deadband, the actuating force is changed to a level related to the displaced position and to the engine speed signal.

7. The machine control system of claim 6, wherein the relationship between the change in the actuating force and the displaced position is substantially linear.

8. The machine control system of claim 7, wherein a rate of change of the actuating force is also related to the engine speed signal.

9. The machine control system of claim 6, wherein the actuating force is maintained above a minimum engagement force of the clutch.

10. The machine control system of claim 2, wherein the actuating force of the clutch when the operator input device is at a position between the neutral position and an end of the deadband is maintained sufficient to inhibit slippage of the clutch.

11. The machine control system of claim 2, wherein:
the actuating force is reduced as the operator input device is moved from the neutral position toward the maximum displaced position;
and the actuating force affected when the operator input device is at a displaced end of the deadband is lower for lower engine speeds.

12. The machine control system of claim 11, wherein the actuating force affected when the operator input device is at the maximum displaced position is higher for lower engine speeds.

13. The machine control system of claim 2, wherein the torque transferred from the engine to the transmission becomes about equal for all engine speeds as the operator input device is moved toward the maximum displaced position.

14. A machine, comprising:
an engine coupled through a torque converter to a transmission;
a clutch configured to connect an output of the engine with an input of the torque converter;
a sensor configured to generate an engine speed signal;
a controller in communication with the clutch and the sensor;
an operator input device configured to indicate an operator desired reduction in an amount of torque transferred from the engine to the transmission, wherein the controller is in communication with the operator input device and configured to vary the actuating force of the clutch based on the operator desired reduction, the operator input device being movable through a range from a neutral position to a maximum displaced position;
wherein the controller is configured to vary the actuating force of the clutch such that the actuating force when the operator input device is at a first position within the range is lower for lower engine speeds compared to that for higher engine speeds, and the actuating force when the operator input device is at a second position of greater displacement than the first position is lower for higher engine speeds compared to that for lower engine speeds.

15. The machine control system of claim 2, wherein the torque transferred from the engine to the transmission has a deadband region roughly corresponding to that of the actuating force.

16. The machine control system of claim 2, wherein the torque transferred from the engine to the transmission is lower at lower engine speeds compared to that at higher engine speeds when the operator input device is at the neutral position.

17. The machine control system of claim 2, wherein the torque transferred from the engine to the transmission decreases roughly linearly as a function of input device displacement when the input device is displaced at a position between the deadband edge and a second location of the operator input device.

18. The machine control system of claim 17, wherein the torque transferred from the engine to the transmission is roughly independent of engine speeds when the input device is displaced past the second location.

* * * * *